United States Patent
Okamoto et al.

(10) Patent No.: US 8,922,936 B2
(45) Date of Patent: Dec. 30, 2014

(54) APPARATUS OF SINGLE WRITE MAGNETIC DISC

(75) Inventors: Iwao Okamoto, Tokyo (JP); Chiyo Saito, Tokyo (JP); Daisuke Masuda, Tokyo (JP)

(73) Assignee: WD Media (Singapore) Pte. Ltd., Singapore (SG)

( * ) Notice: Subject to any disclaimer, the term of this patent is extended or adjusted under 35 U.S.C. 154(b) by 526 days.

(21) Appl. No.: 13/071,132

(22) Filed: Mar. 24, 2011

(65) Prior Publication Data

US 2012/0069466 A1  Mar. 22, 2012

(30) Foreign Application Priority Data

Mar. 31, 2010 (JP) .................... 2010-082745

(51) Int. Cl.
*G11B 15/18* (2006.01)
*G11B 5/02* (2006.01)
*G11B 21/02* (2006.01)
*G11B 5/012* (2006.01)
*G11B 5/127* (2006.01)
*G11B 5/09* (2006.01)

(52) U.S. Cl.
CPC .............. *G11B 5/012* (2013.01); *G11B 5/1278* (2013.01); *G11B 5/09* (2013.01)
USPC .................. 360/71; 360/48; 360/75

(58) Field of Classification Search
None
See application file for complete search history.

(56) References Cited

U.S. PATENT DOCUMENTS

| | | | | |
|---|---|---|---|---|
| 4,799,112 A | * | 1/1989 | Bremmer et al. | 360/31 |
| 5,087,992 A | * | 2/1992 | Dahandeh et al. | 360/31 |
| 5,430,581 A | * | 7/1995 | Moribe et al. | 360/31 |
| 5,657,176 A | * | 8/1997 | Moribe et al. | 360/31 |
| 7,012,773 B2 | * | 3/2006 | Ashikaga et al. | 360/48 |
| 7,342,741 B1 | * | 3/2008 | Emo et al. | 360/78.07 |
| 7,405,893 B2 | * | 7/2008 | Bi et al. | 360/48 |
| 7,996,645 B2 | * | 8/2011 | New et al. | 711/201 |
| 8,120,868 B2 | * | 2/2012 | Bi et al. | 360/48 |
| 8,619,379 B2 | * | 12/2013 | Nonaka et al. | 360/48 |
| 8,638,514 B2 | * | 1/2014 | Sato et al. | 360/48 |
| 2008/0304172 A1 | * | 12/2008 | Bi et al. | 360/48 |

FOREIGN PATENT DOCUMENTS

JP  2007-73138  3/2007

* cited by examiner

*Primary Examiner* — K. Wong

(57) ABSTRACT

An object of the present invention is to further improve a recording density in a magnetic disk apparatus using a shingle write system.

In a magnetic disk apparatus including a magnetic disk, a recording head that writes information on the magnetic disk, and a controller that controls a writing operation of the recording head to the magnetic disk, the controller controls the writing operation such that the recording head writes information on a region including a target track and a portion of track adjacent thereto in an overlapping manner while position-shifting in a radial direction of the magnetic disk and a first writing frequency to a track on which information is last written is higher than a second writing frequency to another track.

6 Claims, 6 Drawing Sheets

FIG. 5
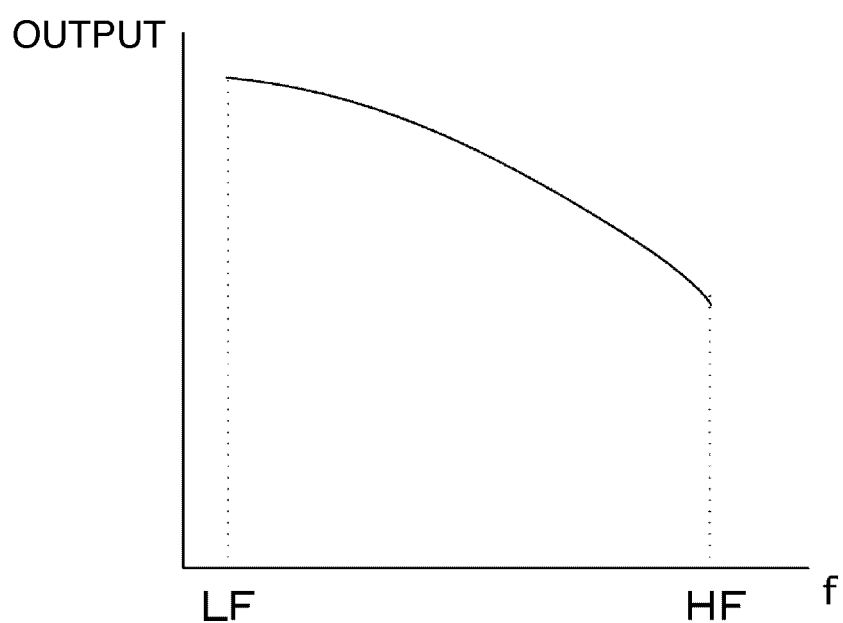
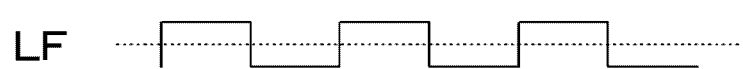
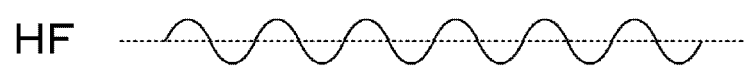

APPARATUS OF SINGLE WRITE MAGNETIC DISC

TECHNICAL FIELD

The present invention relates to a magnetic disk apparatus, and in particular to a magnetic disk apparatus using a shingle write system.

BACKGROUND ART

With an increase in capacity of information processing in recent years, various information recording technologies have been developed. In particular, the surface recording density of an HDD using a magnetic recording technology is continuously increasing at an annual rate of approximately 50%. In recent years, an information recording capacity exceeding 500 gigabytes per disk has been demanded in a magnetic disk with a 2.5 inch diameter for use in an HDD or the like. To fulfill such a demand, an information recording density exceeding 700 GBit/square inch is desired to be achieved.

Further, in recent years, a perpendicular magnetic recording type in which a recording layer is magnetized in a perpendicular direction to a plane of a magnetic disk is adopted in order to further improve a recording density. In order to further enhance the recording density under these circumstances, both a linear recording density in a circumferential direction (BPI: Bit Per Inch) and a track recording density in a radial direction (TPI: Track Per Inch) must be improved while a predetermined S/N ratio is secured.

As a method for improving the track recording density, there is a method which narrows a recording head to reduce a track width. However, when the recording head is narrowed, such a problem occurs that, because a recording magnetic field density lowers, a sufficient S/N ratio cannot be secured. As a method for solving such a problem, therefore, a shingle write system in which information is written on tracks adjacent to each other in a partially overlapping manner has been proposed (for example, see Patent Document 1). Since the recording head can be formed largely by application of the shingle write system, such a merit is provided that the recording magnetic field density can be secured, the S/N ratio can be secured, and a track having a width narrower than a recording width of writing performed by an actual recording head can be achieved.

PRIOR ART DOCUMENT

Japanese Unexamined Patent Application Publication No. 2007-73138

DISCLOSURE OF INVENTION

Problems to be Solved by the Invention

It is made possible to achieve improvement in track recording density by application of the shingle write system, but improvement in linear recording density is insufficient and further improvement in recording density is demanded.

In view of these circumstances, the present invention has been made and an object thereof is to achieve further improvement in recording density in a magnetic disk apparatus using the shingle write system.

Means for Solving the Problem

A magnetic disk apparatus according to the present invention includes a magnetic disk, a recording head that writes information on the magnetic disk, and a controller that controls a writing operation of the recording head to the magnetic disk, in which the controller controls writing operation such that the recording head writes information on a region including a target track and a portion of a track adjacent thereto in an overlapping manner while position-shifting in a radial direction of the magnetic disk and a first writing frequency to a track in which information is last written is higher than a second writing frequency to another track.

In a magnetic disk apparatus according to the present invention, it is preferred that a plurality of bands, each band being composed of a plurality of tracks formed along the radial direction of the magnetic disk, are formed on the magnetic disk, and the writing operation is controlled such that the recording head writes information on the region including a target track and a portion of a track adjacent thereto in an overlapping manner for each band of the plurality of bands while position-shifting in the radial direction of the magnetic disk and a first writing frequency to a track on which information is last written on the band is higher than a second writing frequency to another track on the same track.

In a magnetic disk apparatus according to the present invention, it is preferred that the controller controls the writing operation such that a writing frequency to a track on a band positioned to be closer to the outside of the magnetic disk in the radial direction thereof is higher than a writing frequency to a track on the band positioned to be closer to the inside of the magnetic disk in the radial direction thereof. Or it is also preferred that the controller controls the writing operation such that a writing frequency to a track on a band positioned to be closer to the inside of the magnetic disk in the radial direction thereof is higher than a writing frequency to a track on the band positioned to be closer to the outside of the magnetic disk in the radial direction thereof.

In a magnetic disk apparatus according to the present invention, it is preferred that a width of the track on which information is last written is in a range of 1.2 times to 10 times a width of the another track, and the first frequency is in a range of 1.1 times to 2 times the second frequency.

A magnetic disk apparatus according to the present invention includes a magnetic disk apparatus that, when writing information on a magnetic disk, performs overlapping writing on a region including a target track and a portion of a track adjacent thereto while shifting the recording head in a radial direction of the magnetic disk, in which a plurality of bands, each band being composed of a plurality of tracks formed along the radial direction of the magnetic disk, is formed on the magnetic disk, at least one track having a width relatively wider than that of another track is provided on the band, and a linear recording density of the at least one track is higher than that of the another track.

Effect of the Invention

According to the present invention, in the shingle write system, by controlling writing operation such that the first writing frequency to a track in which information is last written (a track having a relatively wide width) becomes higher than the second writing frequency to another track, it becomes possible to enhance the BPI while securing a predetermined S/N ratio in the track in which information is last written. Further, according to this configuration, even if the number of bands provided along the radial direction of the magnetic disk increases, the recording density can be improved.

BRIEF DESCRIPTION OF DRAWINGS

FIG. 5 is a diagram for describing a relationship between a writing frequency and an S/N ratio.

BEST MODE FOR CARRYING OUT THE INVENTION

During development of a magnetic disk apparatus that satisfies a demand for improvement of a recording density which will more and more increase hereafter, the inventors have focused on that the width of a track on which information is last written necessarily becomes wider than those of the other tracks (tracks on which partial overlapping writing is performed). AS the result of further research for differences between the track in which information is last written and the other tracks, the inventors have found that the S/N ratio of the track on which information is last written is larger than the S/N ratios of the other tracks. The inventors have reached such an idea that improvement in linear recording density can be achieved by making the BPI of the track on which information is last written larger than those of the other tracks, and have completed the present invention.

Embodiments of the magnetic disk apparatus of the present invention will be described below with reference to the drawings.

Figure 1:
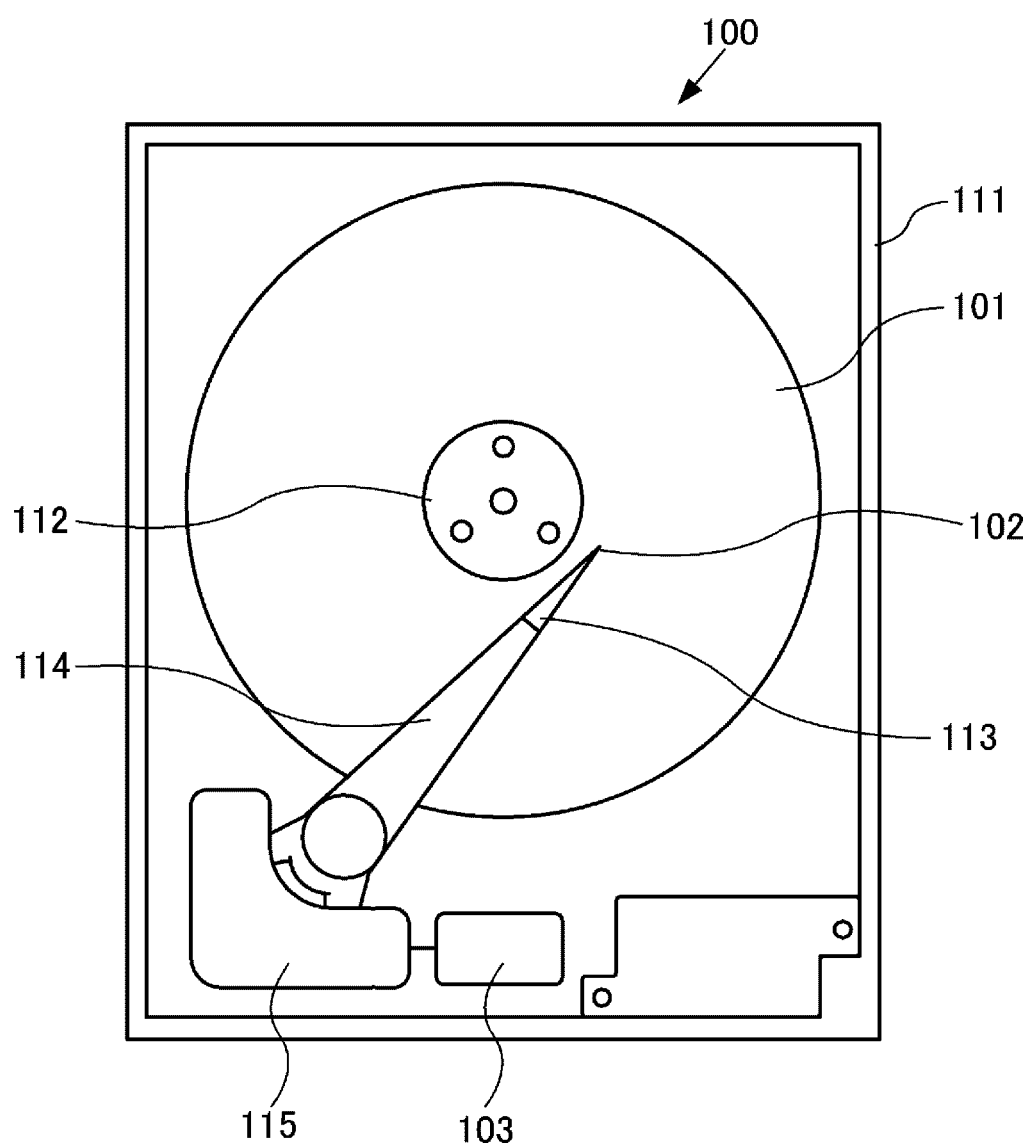
FIG. 1 is a diagram showing one example of a whole configuration of a magnetic disk apparatus according to an embodiment of the present invention.

A magnetic disk apparatus 100 according to the embodiment includes at least a magnetic disk 101, a recording head 102 that writes information on the magnetic disk 101, and a controller 103 that controls a writing operation of the recording head 102 to the magnetic disk 101. The magnetic disk 101 is rotated at a high speed by a spindle motor 112 fixed on a casing 111. The recording head 102 is mounted on a suspension 113, and the suspension 113 is connected to a head arm 114 that is driven by a voice coil motor 115. The controller 103 controls the voice coil motor 115 to position the recording head 102 on a desired track on the magnetic disk 101 (see FIG. 1).

Next, a writing operation of the magnetic disk apparatus 100 according to the embodiment will be described.

Figure 2:
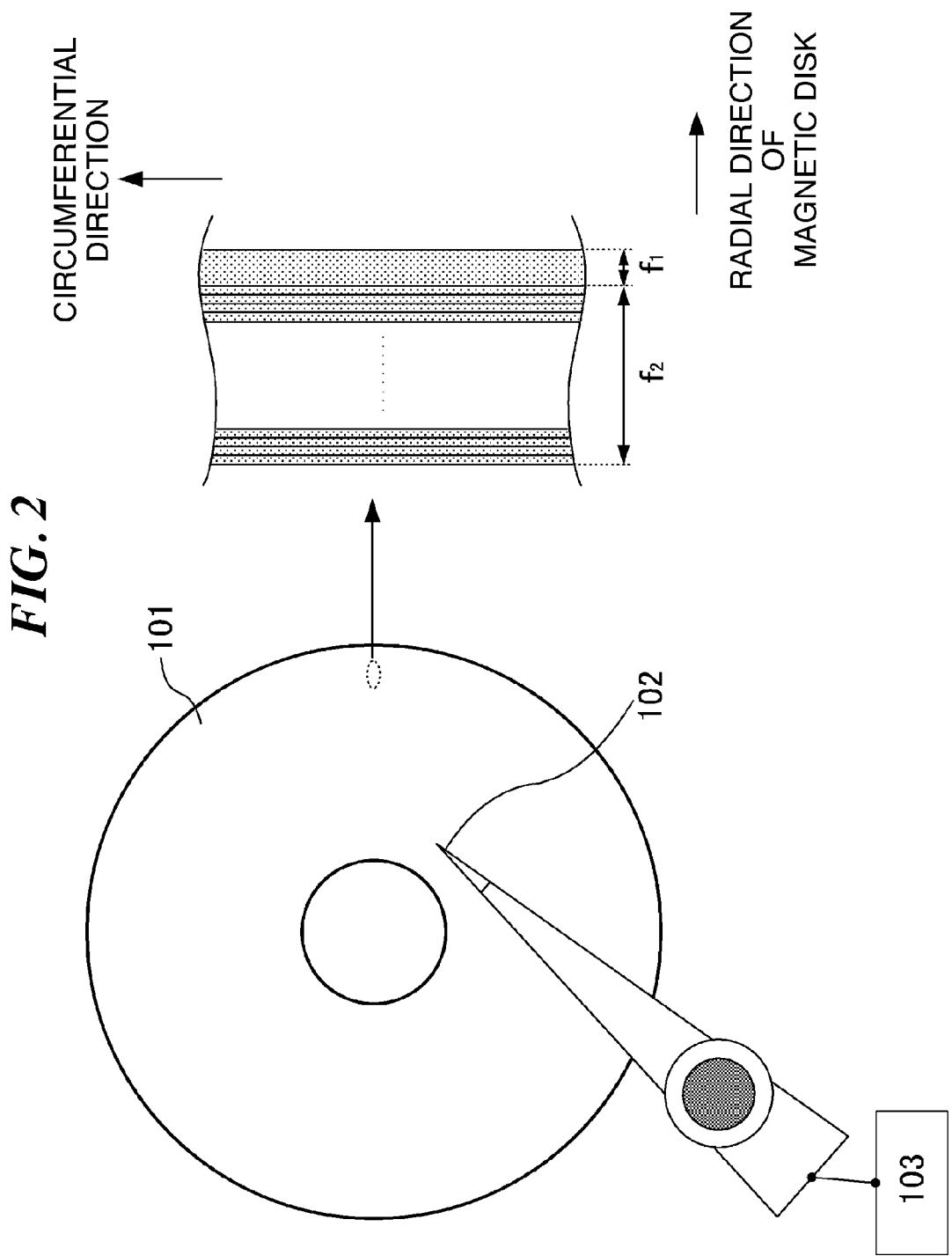
FIG. 2 is a diagram showing one example of a magnetic disk apparatus according to an embodiment of the present invention.

As described above, the writing operation of the recording head 102 to the magnetic disk 101 is controlled by the controller 103. Specifically, the controller 103 controls a writing operation of the recording head 102 to the magnetic disk 101 such that the recording head 102 writes information on a region including a target track and a portion of a track adjacent thereto in an overlapping manner while position-shifting in a radial direction of the magnetic disk 101 and it performs writing on a track on which information is last written at a frequency higher than a frequency applied to the other tracks on which partial overlapping writing is performed (see FIG. 2). In FIG. 2, the overlapping writing operation is performed from an inner circumference of the magnetic disk toward an outer circumference thereof, but the overlapping writing operation may be performed in an opposite manner.

That is, in the magnetic disk apparatus, by the controller 103, writing of information is performed in the shingle write system and the writing operation is controlled such a first writing frequency $f_1$ applied to a track on which information is last written (a track having a relatively wide width) is higher than a second writing frequency $f_2$ applied to the other tracks.

Thereby, since the TPI can be improved using the shingle write system and the BPI of a track having a wider width, which necessarily occurs in the shingle write system, can be improved, the recording density can be improved as a whole magnetic disk.

In general, the BPI of the writing track can be increased by raising a writing frequency, but it becomes difficult to secure the S/N ratio according to increase of the writing frequency. This is because, when the writing frequency is low, a period between a rising and a falling per a pulse of a frequency is short (a pulse width is long), so that the S/N ratio corresponding to an output of the recording magnetic field density of the recording head can be secured, but the period between a rising and a falling per a pulse of a frequency is long (a pulse width is short) according to rising of the writing frequency, so that writing corresponding to an output of the recording magnetic field density of the recording head cannot be achieved (see FIG. 5).

In this embodiment, since a selectively high frequency is set to a (relatively wide) track on which writing is last performed so that writing is performed, even a track on which writing has been performed at a high frequency can secure an S/N ratio approximately equal to that of the other tracks on which writing has been performed at a relatively low frequency.

Further, the values of the first writing frequency $f_1$ and the second writing frequency $f_2$ can be determined by considering values of the S/N ratios of the tracks on which overlapping writing is performed and the track on which a writing operation is last performed (such that the S/N ratios of the both are approximately equal to each other). For example, when the width of the track on which information is last written is in a range of 1.2 times to 10 times the widths of the other tracks, the first frequency $f_1$ may be set to be in a range of 1.2 times to 2 times the second frequency $f_2$. As a preferred example, when the width of the track on which information is last written is 5 times the widths of the other tracks, the first frequency $f_1$ can be set to be 1.3 times the second frequency $f_2$.

Incidentally, in the magnetic disk apparatus of the present invention, writing may be performed to at least one portion of the magnetic disk 101 by the shingle write system, and such a configuration that writing is performed on the whole face of the magnetic disk 101 by the shingle write system is not required necessarily.

Figure 4:
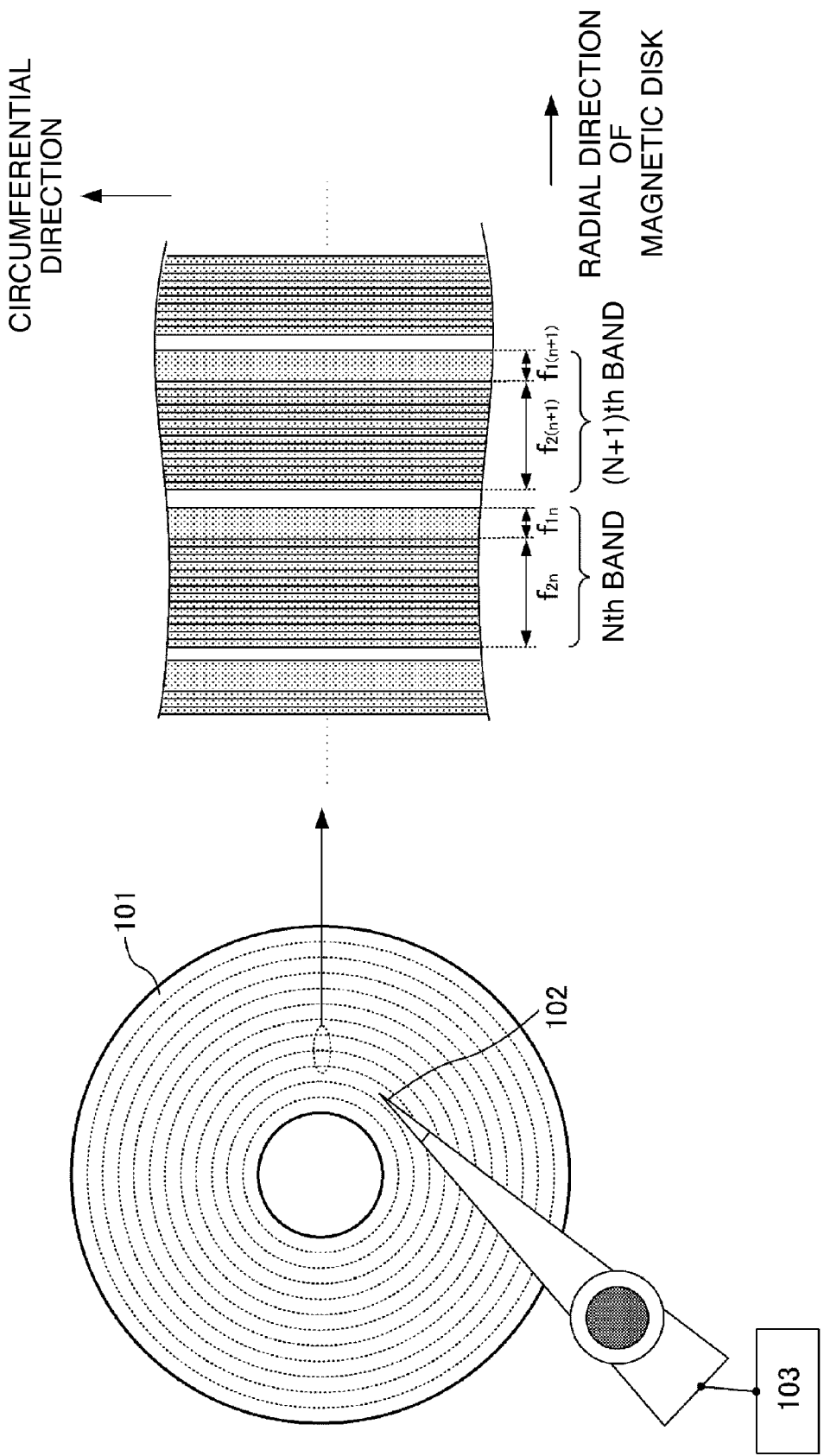
FIG. 4 is a diagram showing one example of a magnetic disk apparatus according to an embodiment of the present invention.

Further, the writing operation to the magnetic disk 101 described above can be similarly applied to such a case that bands composed of a plurality of tracks are provided along a radial direction of the magnetic disk 101, respectively. In this case, the writing operation may be controlled such that overlapping writing is performed for each of bands and the first writing frequency $f_1$ to a track on which information is last written (a track having a relatively wide width) on a band is higher than the second writing frequency $f_2$ to the other tracks on the same band. Incidentally, the same writing frequency may be used to a plurality of bands and different writing frequencies may be used thereto. Referring to FIG. 4, a writing operation performed when bands are provided on the magnetic disk 101 will be described below.

As shown in FIG. 4, a plurality of bands is provided along a radial direction of the magnetic disk, and a plurality of tracks is formed on each of the bands. The number of bands and the number of tracks formed on each band can be set properly according to an intended use, where setting may be performed such that, for example, the number of bands is 4,000 and the number of tracks formed on each band is 100 in the magnetic disk. Incidentally, in FIG. 4, the n-th band and the (n+1)-th band are shown (the "n" indicates an integer of 1 or more).

In the magnetic disk apparatus according to the embodiment, tracks formed on each band can be configured such that the recording head 102 writes information on a region including a target track and a portion of a track adjacent thereto in an overlapping manner for each band while position-shifting in a radial direction of the magnetic disk 101 and it performs a writing operation such that a first writing frequency $f_1$ to a track on which information is last written on a band becomes higher than a second writing frequency $f_2$ to the other tracks on the same band. For example, in the n-th band and the (n+1)-th band, setting may be performed such that $f_{1n} > f_{2n}$, $f_{1(n+1)} > f_{2(n+1)}$ ($f_{1n} = f_{1(n+1)}$, $f_{2n} = f_{2(n+1)}$). Incidentally, the writing operation to each band is controlled by the controller 103.

When writing is performed for each band by the shingle write system, at least one track having a width relatively wider than those of the other tracks on each band is formed on the band. Therefore, it becomes possible to largely improve the magnetic recording density as a whole by enhancing the BPIs of these relatively wider tracks on the respective bands.

Figure 3:
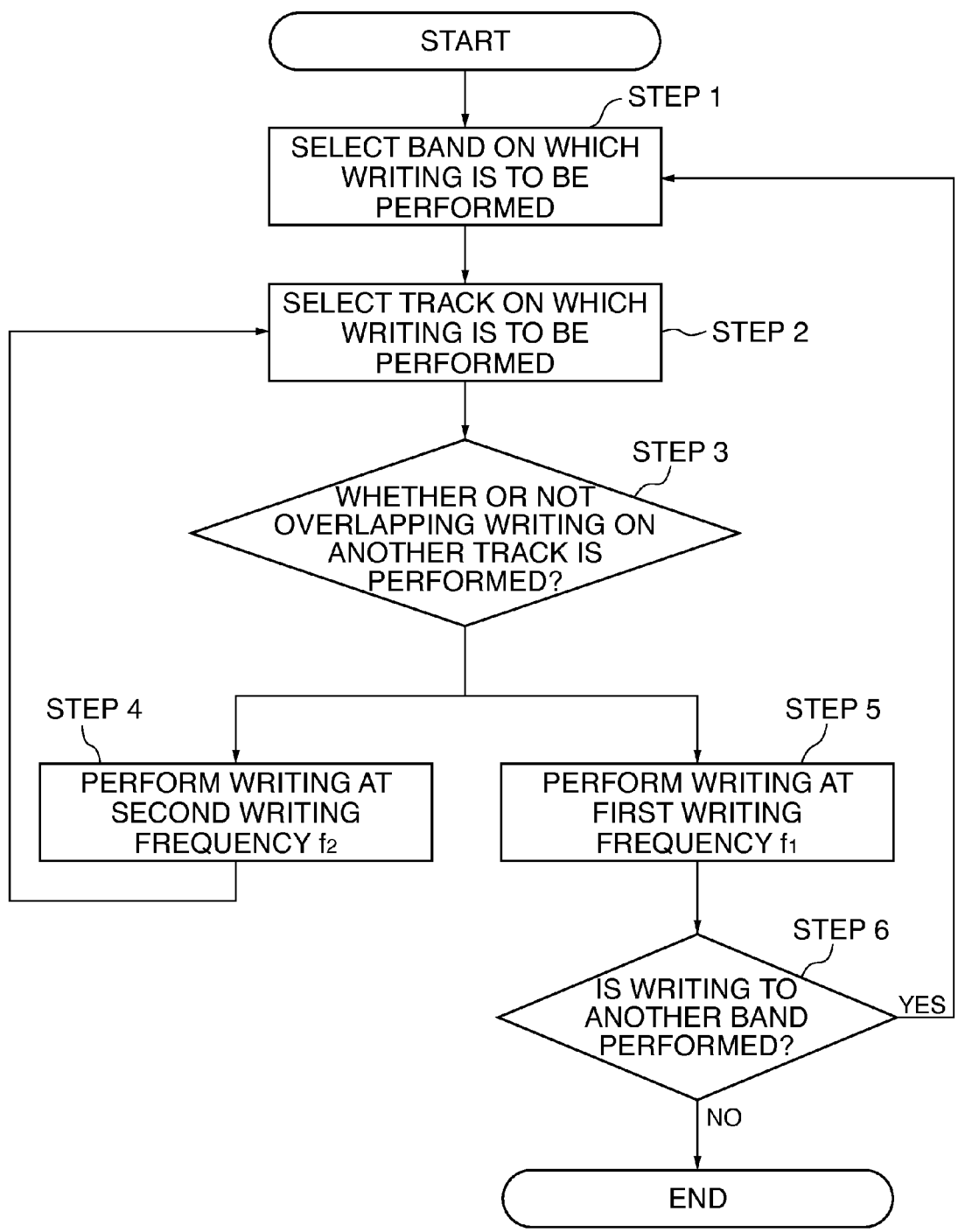
FIG. 3 is a flowchart showing one example of a writing operation of a magnetic disk apparatus according to an embodiment of the present invention.

One example of the writing operation to the magnetic disk 101 will be described below with reference to FIG. 3.

When a writing operation first starts in the magnetic disk apparatus 100, a band on which the writing operation should be performed is selected (step 1). Subsequently, a track on the selected band on which writing should be performed is selected (step 2).

Next, whether or not the track selected at step 2 is a track on which overlapping writing with another track is performed is determined (step 3).

When the selected track is a track on which overlapping writing with an adjacent track is performed later, the writing is performed at the second writing frequency $f_2$ (step 4). When writing has been already performed on the adjacent track in this stage, the writing operation is performed so as to overlap with the adjacent track. Thereafter, a track on which writing should be performed next is selected again.

On the other hand, when the selected track is a track on which overlapping writing is not performed (for example, a track on which writing is last written on the band), the writing is performed at the first writing frequency $f_1$ (step 5). Then, whether or not writing to another band is performed is determined (step 6), when the writing to another band is performed, the above step 1 to step 5 are repeated, while writing is terminated when the writing to another band is not performed.

According to the above operation, writing to the magnetic disk 101 is performed at a plurality of frequencies. Note that, when no band is provided on the magnetic disk 101, the writing operation may be started from step 2.

Incidentally, in the writing operation in the magnetic disk apparatus according to the embodiment, a direction of moving the recording head 102 when information is written for each band on a region including a target track and a portion of a track adjacent thereto in an overlapping manner by the shingle write system can be set properly for each band. For example, considering a skew angle of the recording head 102, it is preferred that the recording head is moved from the inside toward the outside on a band on the magnetic disk 101 positioned to be closer to the inside of the magnetic disk 101 in a radial direction, while the recording head 102 is moved from the outside toward the inside on a band on the magnetic disk 101 positioned to be closer to the outside thereof in the radial direction. Regarding the n-th band and the (n+1)-th band shown in FIG. 4, a case in which a writing operation has been performed while the recording head is being moved along the radial direction of the magnetic disk 101 from the inside toward the outside is shown.

Further, in FIG. 4, the writing operation may be controlled such that a writing frequency to a track on the magnetic disk 101 positioned to be closer to the outside of the magnetic disk in the radial direction thereof is higher than that to a track on the magnetic disk 101 positioned to be closer to the inside in the radial direction. For example, the writing frequency to a track on the (n+1)-th band positioned to be closer to the outside of the magnetic disk 101 in the radial direction thereof can be made higher than the writing frequency to a track on the n-th band positioned to be closer to the inside of the magnetic disk 101 in the radial direction ($f_{1n} < f_{1(n+1)}$ and/or $f_{2n} < f_{2(n+1)}$). Thereby, since the BPI of a track on the band positioned to be closer to the outside of the magnetic disk in the radial direction can be improved effectively, it is made possible to improve the recording density of the magnetic disk 101 dramatically as a whole by combination with the above-mentioned writing operation.

Next, an example which was carried out in order to clarify of the effect of the present invention is described. Specifically, the recording density and the S/N ratio when the writing operations were performed under the conditions shown in the following example 1 and comparative example 1 were evaluated.

Figure 6:
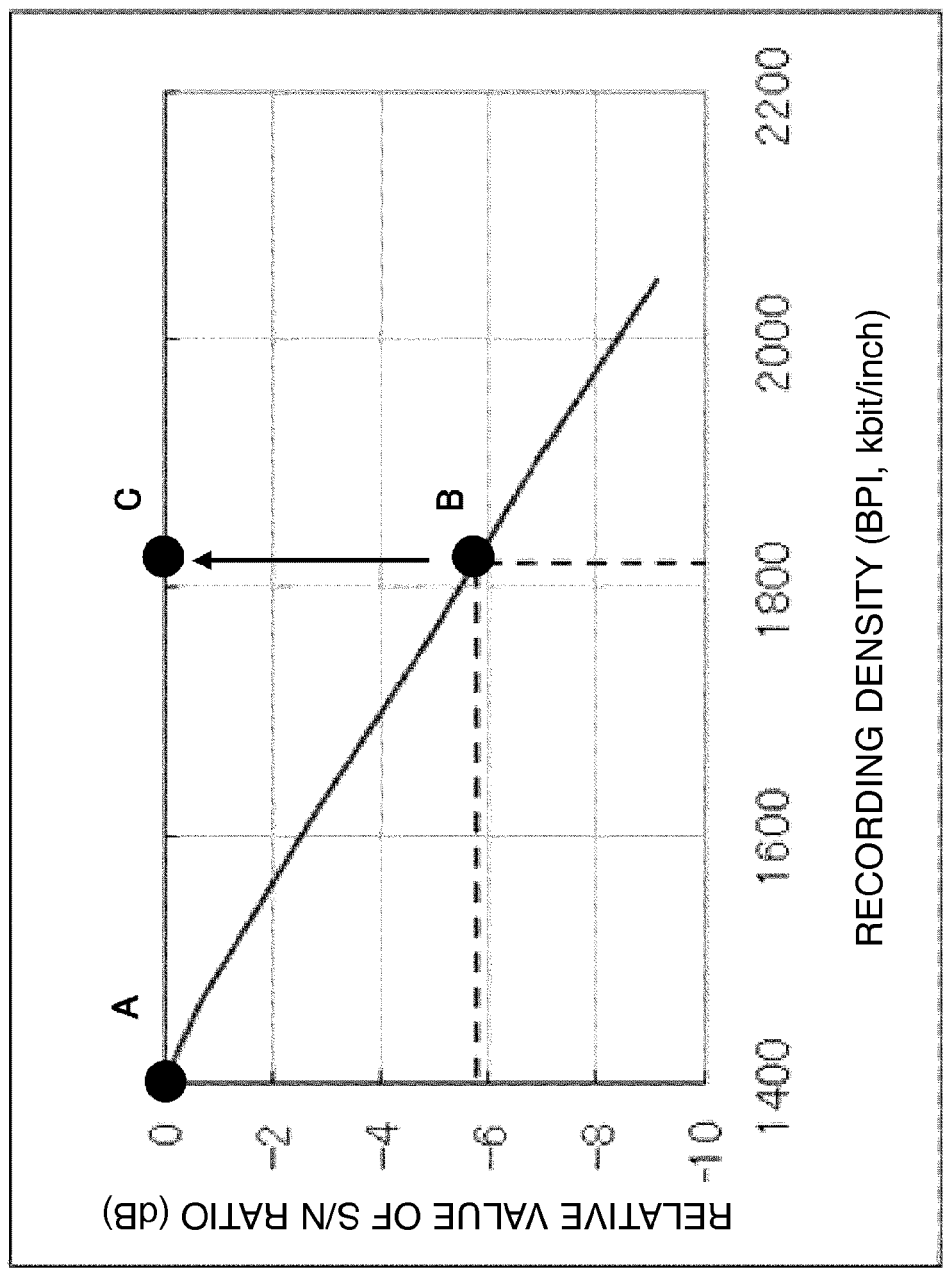
FIG. 6 is a graph for describing evaluation of recoding densities and S/N ratios in an example and a comparative example.

The result was shown in FIG. 6. A curve passing through a point A and a point B in FIG. 6 indicates a relative value of the S/N ratio in the shingle write system. A width of a track applied with an overlapping write was set to 37 nm. On the other hand, in FIG. 6, a point C indicates the S/N ratio of a track (whose width is 160 nm) on which writing is last performed at 1,830 kBPI in the shingle write system. The S/N ratio at this time becomes the same value as that of the S/N ratio at 1,400 kBPI. Thereby, the linear recording density of a track on which writing is last performed can be increased from 1,400 kBPI to 1,830 kBPI.

EXAMPLE 1

The number of bands: 5,060
The number of tracks per band: 100 tracks
Width of track on which writing is last performed: 160 nm
Width of track on which overlapping writing is performed: 37 nm
First writing linear recording density $f_1$: 1,400 kBPI
Second writing linear recording density $f_2$: 1,820 kBPI
Surface recording density: 710.5 Gb/inch$^2$
In this case, a storage capacity per 2.5-inch disk was 507.67 gigabytes.

COMPARATIVE EXAMPLE 1

The number of bands: 5,060
The number of tracks per band: 100 tracks
Width of track on which overlapping writing is performed: 37 nm
Writing linear recording density f: 1,400 kBPI
Surface recording density (S/N ratio): 708.4 Gb/inch$^2$ In this case, a storage capacity per 2.5-inch disk was 506.17 gigabytes. Thereby, in comparison with the example, increase of the storage capacity of 1.50 gigabytes per 2.5-inch disk was made possible by application of the writing configuring the example 1.

Incidentally, the present invention is not limited to the above embodiment and example, but it may be implemented while modified properly. For example, sizes, processing procedures, and the like in the above embodiment are only examples, and they can be variously modified within a scope in which the effect of the present invention can be achieved. Besides, the present invention can be implemented without departing from the purpose of the present invention.

DESCRIPTION OF REFERENCE NUMERALS

101 . . . magnetic disk
102 . . . recording head
103 . . . controller
111 . . . casing
112 . . . spindle motor
113 . . . suspension
114 . . . head arm
115 . . . voice coil motor

The invention claimed is:

1. A magnetic disk apparatus comprising:
a magnetic disk,
a recording head that writes information on the magnetic disk, and
a controller that controls a writing operation of the recording head to the magnetic disk, wherein
the controller controls the writing operation such that
1) the recording head writes information on a region, selected from a plurality of bands formed on the magnetic disk, each band being composed of a plurality of tracks formed along a radial direction of the magnetic disk, comprising a target track and a portion of an adjacent track thereto on the same band in an overlapping manner while position-shifting in the radial direction of the magnetic disk, and
2) the recording head writes at a first writing frequency to a track on which information is last written that is higher than a second writing frequency at which the recording head writes to the adjacent track on the same band.

2. The magnetic disk apparatus according to claim 1, wherein the first writing frequency for the track is higher than the second writing frequency for the adjacent track, both tracks being on the same band, such that the plurality of tracks on the band have substantially equal signal to noise (S/N) ratios.

3. The magnetic disk apparatus according to claim 1, wherein the controller controls the writing operation such that a writing frequency for information written to a track on a band positioned to be closer to an outside of the magnetic disk in the radial direction thereof is higher than a writing frequency for information written to a track on the band positioned to be closer to an inside of the magnetic disk in the radial direction thereof.

4. The magnetic disk apparatus according to claim 1 or claim 3, wherein a width in the radial direction of the track on which information is last written is in a range of 1.2 times to 10 times a width in the radial direction of the adjacent track, and the first frequency is in a range of 1.1 times to 2 times the second frequency.

5. A magnetic disk apparatus that, when writing information on a magnetic disk, performs overlapping writing on a region including a target track and a portion of a track adjacent thereto while shifting the recording head in a radial direction of the magnetic disk, wherein
a plurality of bands is formed on the magnetic disk, each band being composed of a plurality of tracks formed along the radial direction of the magnetic disk, at least one band comprising one track having a width relatively wider in the radial direction of the magnetic disk than that of an adjacent track on the same band and a linear recording density of the one track is higher than that of the adjacent track.

6. A magnetic disk apparatus comprising:
a magnetic disk,
a recording head that writes information on the magnetic disk, and
a controller that controls a writing operation of the recording head to the magnetic disk, wherein
the controller controls the writing operation such that
1) the recording head writes information on a region, selected from a plurality of bands formed on the magnetic disk, each band being composed of a plurality of tracks formed along the radial direction of the magnetic disk, comprising a target track and a portion of an adjacent track thereto on the same band in an overlapping manner while position-shifting in a radial direction of the magnetic disk, and
2) the recording head writes at a first writing frequency to a track on which information is last written that is higher than a second writing frequency the recording head writes at to-the adjacent track on the same band,
wherein the track has a width relatively wider in the radial direction of the magnetic disk than the width of the adjacent track on the same band, and
wherein the controller selects between at least a first and a second writing frequency for writing on a selected track depending on whether overlapping writing to be performed on the track.

* * * * *